United States Patent
Pal

(10) Patent No.: US 7,213,020 B1
(45) Date of Patent: May 1, 2007

(54) METHODS AND SYSTEM FOR FACILITATING UPDATING OF DATA IN A DATABASE BY A DATA ACCESS SYSTEM

(75) Inventor: Suprio Pal, Corona, CA (US)

(73) Assignee: Unisys Corporation, Blue Bell, PA (US)

(*) Notice: Subject to any disclaimer, the term of this patent is extended or adjusted under 35 U.S.C. 154(b) by 1100 days.

(21) Appl. No.: 10/209,481

(22) Filed: Jul. 30, 2002

(51) Int. Cl.
*G06F 17/30* (2006.01)
*G06F 9/54* (2006.01)

(52) U.S. Cl. .............. 707/10; 707/202; 707/3; 718/101

(58) Field of Classification Search .............. 707/1–10, 707/100–206; 709/200–253; 718/101
See application file for complete search history.

(56) References Cited

U.S. PATENT DOCUMENTS

| | | | |
|---|---|---|---|
| 5,758,333 A * | 5/1998 | Bauer et al. .................... | 707/1 |
| 5,893,113 A * | 4/1999 | McGrath et al. ............ | 707/200 |
| 5,956,646 A | 9/1999 | Kolev et al. | |
| 6,038,568 A * | 3/2000 | McGrath et al. ............ | 707/200 |
| 6,115,715 A | 9/2000 | Traversat et al. | |
| 6,192,370 B1 | 2/2001 | Primsch | |
| 6,246,410 B1 | 6/2001 | Bergeron et al. | |
| 6,873,995 B2 * | 3/2005 | Benson et al. .......... | 707/103 R |
| 6,947,952 B1 * | 9/2005 | Welch et al. ............ | 707/104.1 |

OTHER PUBLICATIONS

Biliris, Alexandros et al. "Transactions in the Client-Server EOS Object Store." IEEE. Mar. 1995.*

* cited by examiner

*Primary Examiner*—Lewis A. Bullock, Jr.
(74) *Attorney, Agent, or Firm*—Nathan Cass; Alfred W. Kozak; Mark T. Starr

(57) ABSTRACT

Methods for facilitating updating of data in a database by a data-access system in communication with the database and a client application. The methods include initiating updating transactions by the data-access system based on requests from the client application for obtaining a portion of the database using a predetermined obtaining protocol; generating transaction identifiers with identifier values in the data-access system upon the initiating of each updating transaction; assigning a transaction identifier or a predetermined transaction identifier to each obtained portion; modifying at least one of the obtained portions of the database based on instructions received from the client application; and forwarding said modified portions to the database based on the transaction identifier assigned to each modified portion. In this way, the overall efficiency of the data-access system in processing of the client updating requests can be advantageously increased.

20 Claims, 10 Drawing Sheets

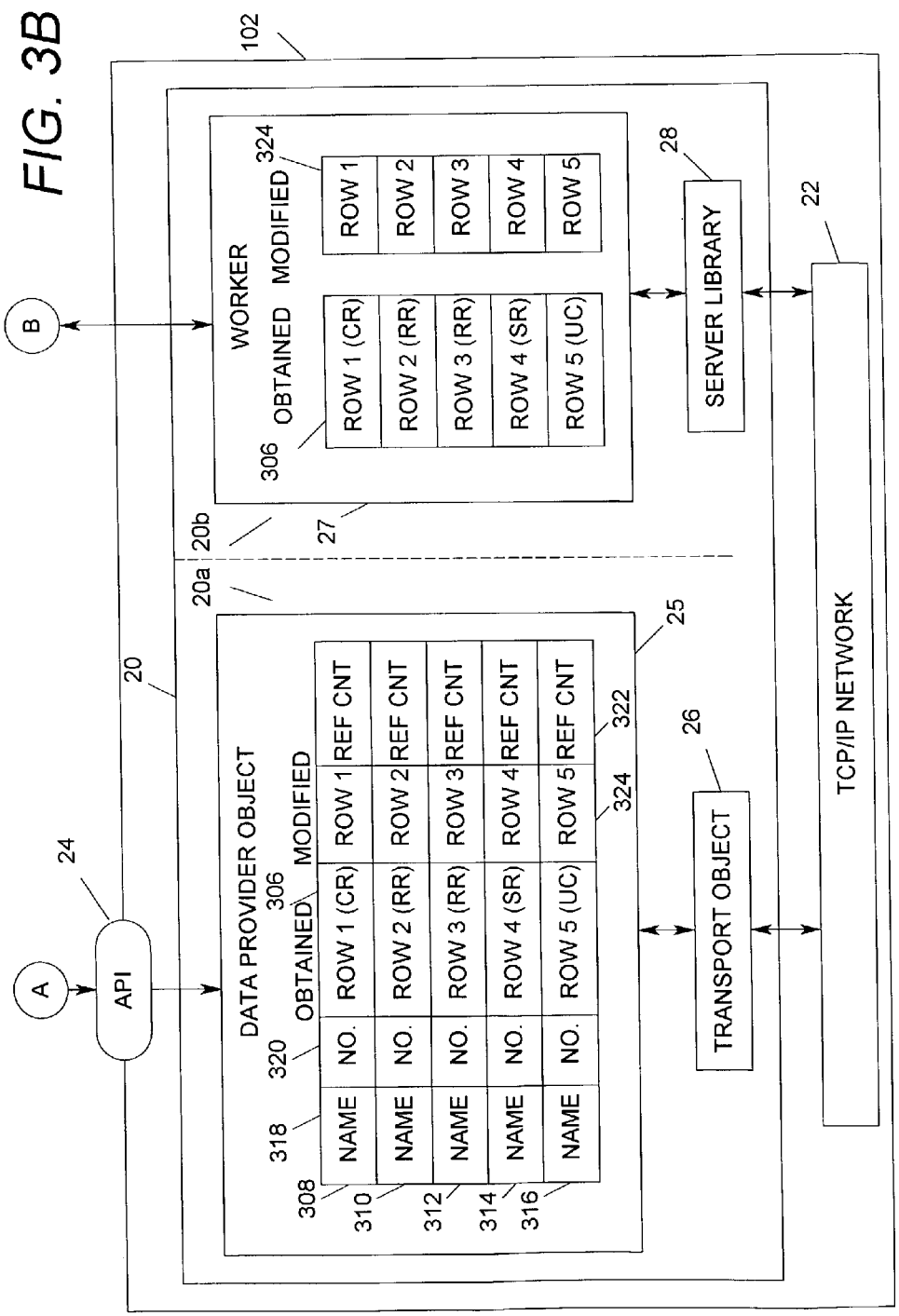

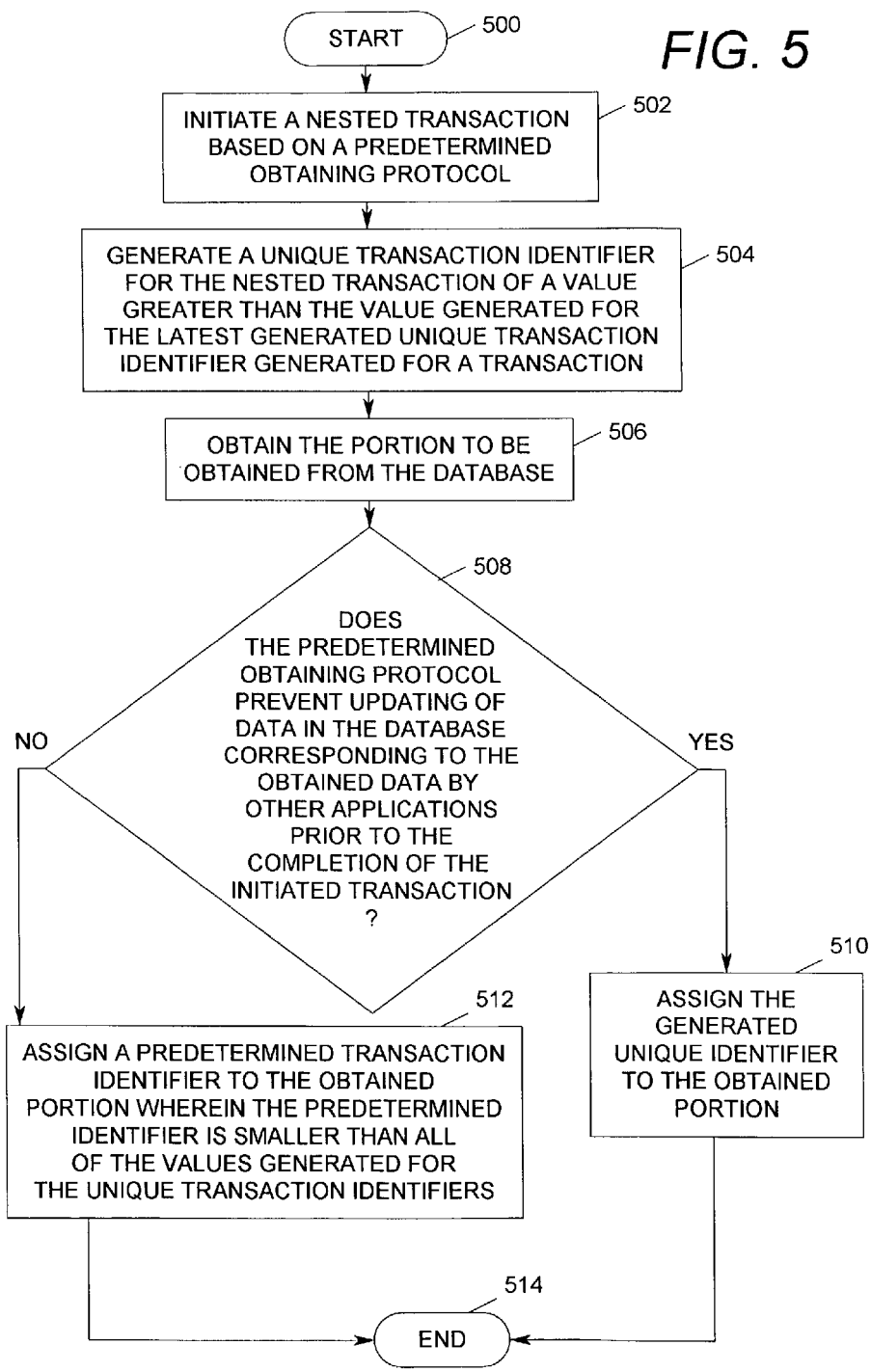

METHODS AND SYSTEM FOR FACILITATING UPDATING OF DATA IN A DATABASE BY A DATA ACCESS SYSTEM

FIELD OF THE INVENTION

This invention relates to the field of computer based information systems such as a computer networked databases. More particularly, the present invention is directed to methods and system for facilitating updating of data in a database by a data-access system in communication with the database and a client application.

BACKGROUND OF THE INVENTION

Computer based information systems are in widespread use today, ranging from simple small area file-sharing networks to global and sophisticated computer networked databases which provide the backbone for today's World Wide Web.

Generally, a user can access information stored on computer networked databases utilizing a client application such as a Windows™ application, which resides at the user's location such as on the user's personal computer. The client application is typically interfaced to a data-access system which is in turn interfaced to the computer networked database at a local or remote location. Pursuant to a request by a user to obtain a desired information, the client application communicates with the data-access system which in turn communicates with and queries the computer networked database for the requested information. Once the information is found, it is forwarded to the client application via the data-access system for presentation to the user.

Computer networked databases are generally designed to store data in data tables. Each table typically contains a set of rows, with each row having column-attributes in which the data is stored. For ease of search and access, information stored in each table is often categorized based on predetermined characteristics of the stored data. For example, in a university database system a table may be devoted to store information on the faculties where each row in the table contains the name of one faculty member, and where the information about that member such as age, identification numbers and years of experience are each stored in a separate column-attribute of that row. Still, another table may be similarly devoted to the names and description of courses offered by the university.

Currently, data-access systems play an important role in establishing an interface between the client application and the computer networked database server. A key feature of a data-access system is the ability to query a networked database for information request by a client application. Such data-access systems are implemented based on data-access models which provide underlying standard data access specifications for the data-access system. One form of such data-access model is the Object Linking and Embedding Database (OLE DB) Data Access on which an OLE DB data-access system is based.

While in widespread use today, OLE DB-based data-access systems are not without shortcomings, particularly when used by a client application to perform updating operations such as changing or deleting of data in the database. Generally, a client application requests data from database via the OLE DB-based data-access system which then obtains the requested data from the database in form of one or more rows in tables which contain the requested data. The obtained rows are then presented to the client application which performs the updating operations on the data in the rows.

To preserve the integrity and accuracy of data in the database corresponding to the data in an obtained row during the updating operations, a system of transaction isolation levels is used to determine a measure of extent to which changes are allowed to be made by other applications to data in the database corresponding to the requested data obtained by the client application. Generally, lower isolation levels such as Read Uncommitted (also called Browse) and Read Committed (also called Cursor Stability) allow for changes to be made to the data in the database that correspond to the requested data, while higher isolation levels such as Repeatable Read and Serializable (also called isolated) do not allow for (i.e. prevent) any changes to be made to the data in the database that correspond to the requested data.

Additionally, the process of modifying an obtained row involves generation of a duplicate of the requested data on which the client application performs the modification. To ensure that no changes have been made to the corresponding data in the database since the obtainment of the row, both the obtained row and the modified row are sent to the database. A comparison is then made between the obtained row and the corresponding data in the database. If no discrepancies are found, then it is deemed that no changes have been made to the corresponding data in the database since the obtainment of the row, and therefore the row is replaced with the modified row, or deleted if such has been requested. If discrepancies are found, then it is deemed that changes have been made to the corresponding data in the database since the obtainment of the row, and the client application is then notified of this circumstance, such as by way of a transmitted error message.

While this approach provides an effective method for preserving the integrity and accuracy of data in the database, it results in inefficient use of the system and networking resources. In particular, excessive network traffic is caused by transmission of the obtained row along with the modified row to the database, as well as extra consumption of the processor resources for verifying concurrency control constraints in comparing of the obtained row with the corresponding data in the database. This inefficiency becomes particularly stark in high volume multi-programmed transaction processing environments where it is highly imperative that application programs which perform update intensive tasks on the databases to be able to do so in as efficient a manner as possible to reduce operational processing time.

An ongoing need thus exists to reduce the need for transmission of the obtained row along with the modified row and the comparison of the obtained row with the corresponding data in the database thus to increase the overall efficiency of a data access system.

SUMMARY OF THE INVENTION

It is an object of the present invention to provide a method and system for facilitating updating of data in a database by a data-access system in communication with the database and a client application by reducing the need for transmission of the obtained row along with the modified row and the comparison of the obtained row with the corresponding data in the database An advantage of the present invention is the reduction in network traffic caused by transmission of the obtained row along with the modified row, as well as extra consumption of the processor resources for verifying concurrency control constraints in comparing of the obtained row with the corresponding data in the database.

These and other objects, which will become apparent as the invention is described in detail below, are provided by a data-access system in communication with the database and a client application, wherein a method is disclosed for facilitating updating of data in a database by a data-access system in communication with the database and a client application. The method includes initiating a plurality of updating transactions by the data-access system based on a plurality of requests received from the client application for obtaining a portion of the database based on at least one predetermined obtaining protocol. The method further includes generating a plurality of transaction identifiers in the data-access system wherein each transaction identifier having an identifier value and generated upon the initiating of an updating transaction in the plurality of updating transactions and correspond to the initiated updating transactions. The method further includes assigning at least one of the transaction identifier and a predetermined transaction identifier to the portion obtained by the updating transaction, and modifying at least one of the obtained portions of the database based on instructions received from the client application. The method further includes forwarding said modified portions to the database based on the transaction identifier assigned to each modified portion.

Another method is disclosed for facilitating updating of data in a database by a data-access system in communication with the database and a client application. The method includes initiating an updating transaction by the data-access system based on a request received from the client application for obtaining a portion of the database based on a predetermined obtaining protocol, and generating a transaction identifier in the data-access system corresponding to the updating transaction. The method further includes assigning the transaction identifier to the portion obtained by the updating transaction, modifying the obtained portion of the database based on instructions received from the client application, and forwarding the modified portion to the database based on the assigned transaction identifier.

Still other objects, features and advantages of the present invention will become readily apparent to those skilled in the art from the following detailed description, wherein is shown and described only the exemplary embodiments of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The accompanying drawings, which are incorporated in and constitute a part of this specification, illustrate one or more embodiments of the invention and, together with the present description, serve to explain the principles of the invention.

In the drawings:

FIG. 5 is a flow chart of the process for initiating of nested updating transactions according to another method of the present invention as illustrated in FIG. 4.

DETAILED DESCRIPTION OF THE INVENTION

Figure 1:
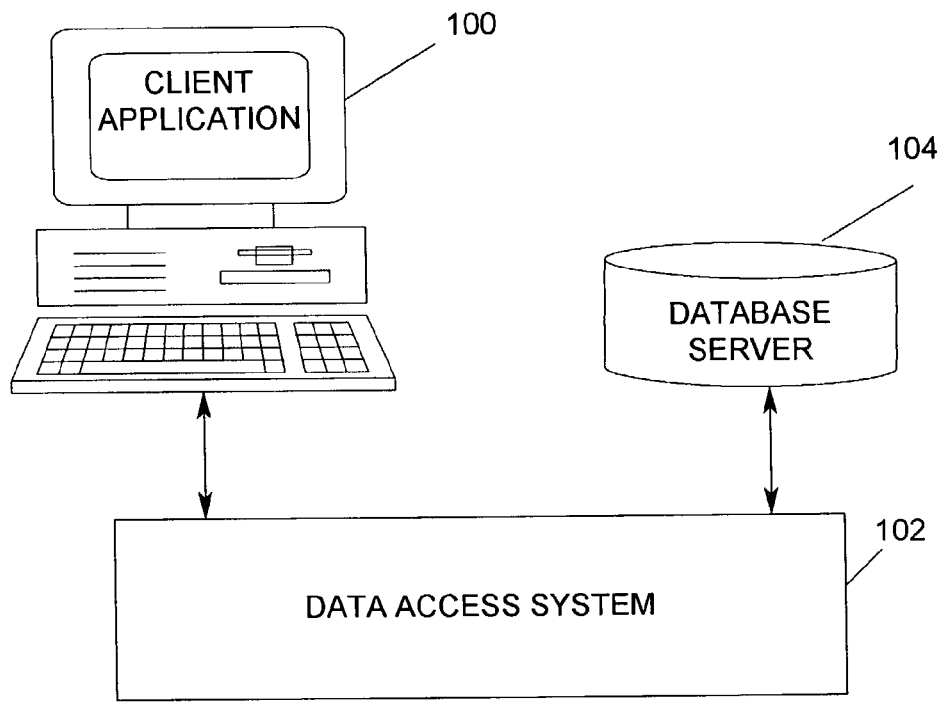
FIG. 1 is a top-level block diagram of a system that may employ the methods and system of the present invention.

Several embodiments of the present invention are described herein in the context of facilitating updating of data in a database by a data-access system in communication with the database and a client application. Those of ordinary skill in the art will realize that the following description of the present invention is illustrative only and is not intended to be in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all of the routine features of the implementations described herein are described. The present invention may be practiced in conjunction with various data-access systems which follow the Object Linking and Embedding Database (OLE DB) Data Access Model and are conventionally used in the art, and only so much of the commonly practiced operations are included herein as are necessary to provide an understanding of the present invention. It will of course be appreciated that in the development of any such actual implementation, numerous implementation-specific decisions must be made to achieve the developers' specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

Nested transactions occur when a new transaction is initiated on a session that is already inside the scope of an already initiated transaction. The new transaction is then said to be nested (or below the level of) the already initiated transaction. Generally, modifications to the obtained data made within the nested transaction are invisible to the earlier initiated transaction until the nested transactions are committed.

Transaction isolation levels are used to determine a measure of extent to which changes are allowed to be made by other applications to data in the database corresponding to the requested data obtained by the client application. Generally, lower isolation levels such as Read Uncommitted (also called Browse) and Read Committed (also called Cursor Stability) allow for changes to be made to the data in the database that correspond to the requested data, while higher isolation levels such as Repeatable Read and Serializable (also called isolated) do not allow for any changes to be made to the data in the database that correspond to the requested data.

A transaction identifier is a means of identification, such as a number, assigned to a row based on the updating transaction used to obtain the row from the database. Examples of transaction identifier as used throughout the detailed disclosure include unique transaction identifiers used for recognizing said higher isolation levels such as Repeatable Read and Serializable (also called isolated) employed in the obtaining of a row or rows, and predetermined transaction identifiers such as a predetermined set number or a flag used for recognizing said isolation levels such as Read Uncommitted (also called Browse) and Read Committed (also called Cursor Stability).

Bookmarks are placeholders that enable the user to return quickly to a row in a table. Typically, a database application assigns a bookmark which points to a particular row or set of rows in a table. The user can then obtain and use the bookmark to directly access that row in a table at a later time.

Referring now to the drawings and FIG. 1 in particular, a top-level block diagram of a system that may employ the methods and systems of the present invention is shown. A client application 100 executing on a computing system is illustrated. The client application 100 is in communication with data access system 102 which in turn is in communication with database server 104. Database server 104 may be local or at a remote location relative to the computing system executing client application 100. The data access system 102 is tasked with receiving requests for data from client application 100, then communicating with the database 104 to obtain the requested data, and providing the client application with the obtained data. For simplicity, only one computing system executing a client application 100 is illustrated in FIG. 1 although it should be noted that many more computing systems on which multiple client applications 100 reside may also be coupled to the data access system 102 to access a number of database servers 104.

Figure 2:
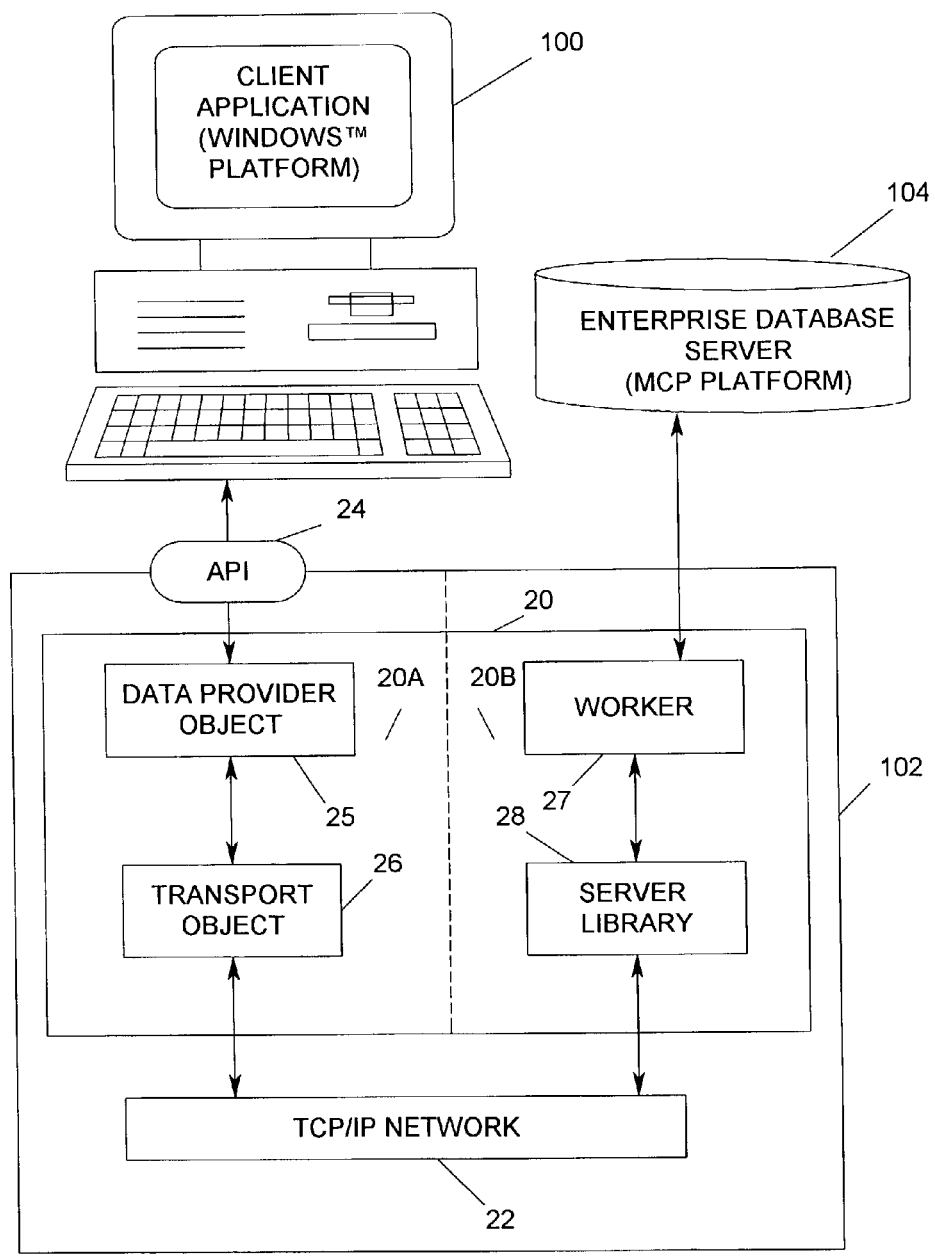
FIG. 2 is an expanded block diagram of an exemplary system that may employ the methods and system of the present invention.

FIG. 2 is an expanded block diagram of an exemplary system that may employ the methods and systems of the present invention as shown in FIG. 1. To better illustrate the functioning of the present invention, an exemplary embodiment of the present invention is used throughout the specifications in which the data-access system 102 is a Unisys OLE DB Data Provider utilizing bookmarks and interfacing with a Windows™ client application 100 (such as substantially all versions of Microsoft Windows released from 1995–2000, Windows NT and XP) at one end and with an Enterprise Database Server 104 operating on a Clearpath Master Control Program (MCP) platform at the other end, although it should be noted that the present invention is not in anyway limited to the foregoing exemplary products.

As shown in FIG. 2, the data access system 102 includes the OLE DB Data Provider 20 and the communication subsystem 22. The OLE DB Data Provider 20 is a two-tiered request-response processing application that includes a client-end 20a and a server-end 20b which communicate with one another via the communication subsystem 22, such as a TCP/IP network. The client-end 20a includes data provider 25 and transport object 26, while the server-end 20b includes the server library 28 and worker 27. The OLE DB Data Provider 20 enables the client application 100 to request data from the Enterprise Database Server 104 operating on Clearpath Master Control Program (MCP) platform (also known as DMSII by those skilled in the art). The Windows™ client application 100 can be remote or it can be executing on the Windows™ operating system side of a Clear Path MCP server. In an exemplary embodiment, the client application 100 runs on the same platform as the client-end 20a of the OLE DB Data Provider 20.

The overall operations of the present invention will now be disclosed in greater detail in FIGS. 3–7 in conjunction with FIG. 2. As shown in FIG. 2, a client-request for information from the client application 100 is received by the data provider 25 which interacts with the client application via an application program interface (API) 24. In an exemplary embodiment, the data provider 25 presents an OLE DB data source API 24 to the client application 100. Once the client-request is received in the data provider 25, the data provider 25 then passes the client-request to the transport object 26. The transport object 26 is adapted to use the communication subsystem 22 to forward the client-request to server-end 20b, at where it is ultimately received by Worker 27 which is activated on demand by the sever library 28. The Worker 27 then interacts with the Enterprise Database Server 104 to search for and obtain the requested information from the Enterprise Database Server 104. Once the information is obtained, the Worker 27 stores the information in an OLE DB-compliant data format and forwards it back to the data provider 25 via the communication subsystem 22 and transport object 26. The data provider 25 subsequently converts the information received from the Worker 27 into a predetermined format recognized or requested by the client application 100 and then presents the information to the client application 100 in that format. In an exemplary embodiment of the present invention, the Worker 27 and data provider 25 each include data-storage capabilities such as random-access-memory (RAM) or a magnetic data-storage disk for storage of received data.

In an exemplary embodiment, three types of data provider are included within the OLE DB Data Provider 20: 1) Enterprise Database Server data provider such as Unisys.DMSII or Unisys.DMSII. 1, which supports read/write access to data form the Enterprise Database Server 104; 2) MCP Data File data provider such as Unisys.NXFile or Unisys.NXFile. 1, which allows read-only access to data from MCP sequential, relative and indexed (KEYEDIO and KEYEDIOII) files; and 3) DMS data provider, which allows access to databases on ClearPath OS 2200 databases. Generally, a client application 100 initiates one such data provider 25 for each database 104 from which it requires data by creating an instance of the data provider 25 as data source. A client application 100 can initiate simultaneous data providers 25. The databases 104 can be on the same or different systems. In turn, the data provider 25 request starts a single transport object 26 and Worker 27 which retrieve data from the database 104 and return it to the data provider 25 for presentation to client application 100. In an exemplary embodiment using the Windows™ application, Microsoft multithreading operation is supported during this process.

Typically, a data provider 25 initiates a Worker 27 to perform the activities for data retrieval from database 104 required by the data provider 25. The Worker 27 retrieves the data from the database 104 and prepares it for transport through the server library 28 and the communication subsystem 22 to the transport object 26. The data provider 25 operations are terminated by the client application 100, but as long as the data provider 25 is active, the client application 100 can continue to use it for data requests. The system automatically terminates the operations of the worker 27 once the operations of data provider 25 that the worker 27 has been serving has also been terminated.

Although currently OLE DB data providers enjoy widespread usage for retrieval of data from databases, improvements can always be made, particularly when the OLE DB Data Providers are used for updating accessed data from a database.

Figure 3A:
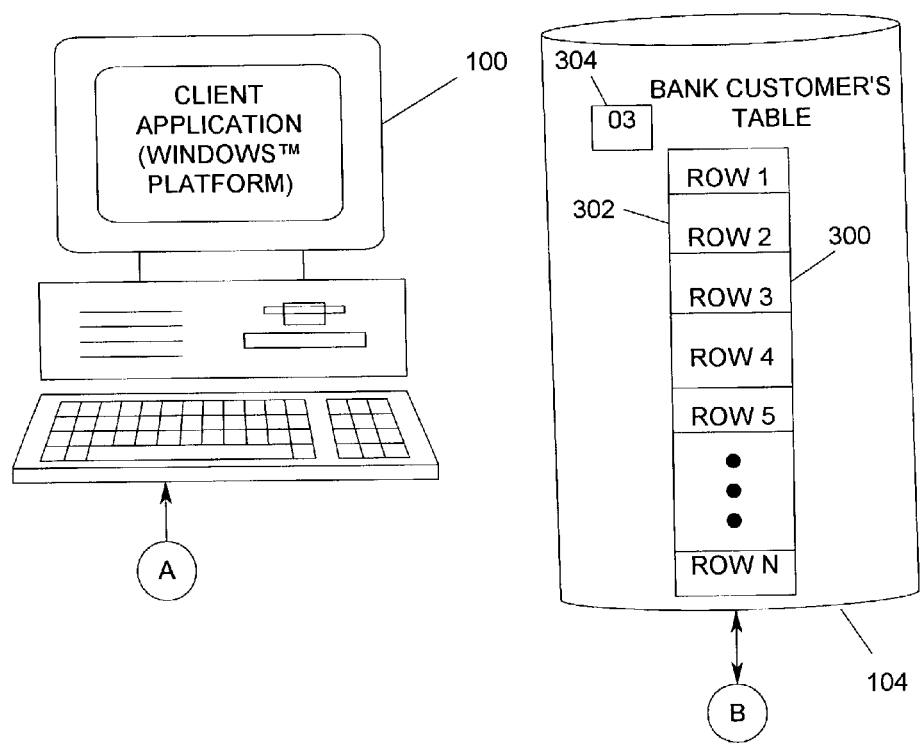
FIG. 3, developed as FIGS. 3A and 3B, is another expanded block diagram of an exemplary system that may employ the methods and system of the present invention.

FIG. 3 illustrates an expanded block diagram of the system of FIG. 2 as currently used in the art for updating accessed data from a database. In databases such as database 104, data are stored in data tables, with each table typically containing a set of rows, and each row having column-attributes in which the data is stored. For ease of search and access, information stored in each table is often categorized based on predetermined characteristics of the stored data. For example, in the environment of a bank, a typical bank customer table 300 contains a set of rows 302, such as Row 1–Row N wherein each row 302 corresponds to an individual customer. Each customer row has also a number of column-attributes (not shown) in each of which a data corresponding to that customer is stored, such as customer name, address, bank account number, and current and previous account balances. When a modification to a bank customer table 300 is to be done, such as updating customer records, a client application 100, such as banking client application requests obtaining of one or more rows 302 from one or more tables in the database 104. For simplicity of illustration, only one table 300 is shown and accessed in FIG. 3 although any number of tables may be accessed and updated.

Generally, to obtain one or more rows from bank customer table 300 the client application 100 instructs the data provider object 25 to initiate an updating transaction using a predetermined obtaining protocol specified by the client application 100. The predetermined obtaining protocol specified by the client application 100 may vary from one row 302 to another. The data provider object 25 then initiates an updating transaction containing the instructions received from the client application 100 and communicates the transaction to the Worker 27 in the manner described in FIG. 2. The Worker 27 then communicates with database 104 to obtain the requested rows from table 300 based on the predetermined obtaining protocol specified by the client application 100. In an exemplary embodiment, the predetermined obtaining protocol uses a transaction isolation level which is either a 1) lower isolation level such as Read Uncommitted (UC) and Read Committed (CR) which allow for changes to be made to the data in the database 104 that correspond to the requested data during the initiated updating transaction; or 2) a higher isolation level such as Repeatable Read (RR) and Serializable (SR) which prevents any changes to be made to the data in the database 104 that correspond to the requested data during the initiated transaction.

Once the desired rows, such as rows 1–5 are obtained, the Worker 27 forwards the obtained rows 306 to data provider object 25 in the manner described in FIG. 2. The obtained rows 306 are then stored in the data provider object 25. In an exemplary embodiment, a set of row handles 308–316 are used in the data provider object 25, with one row handle for storing each of rows 1–5. A row handle may also include column-attributes for storing additional information corresponding to each row such as a table name attribute 318 for storing the name of table 300 (i.e. "Bank Customer Table"), a table number attribute for storing table number such as table number 304, and other attributes such as reference count attribute 322 for storing the number of times a row is referenced by the client application 100. A copy of each of obtained rows 306 is also made, as shown by modified rows 324, for performing modifications requested by the client application 100 so that the originally obtained rows 306 will not be changed as the results of the modifications.

Once the modifications by client application 100 are performed, then the modifications are sent to database 104 for updating of table 300. To ensure that no changes have been made to the corresponding data in the database 104 since the obtainment of the rows 306, both the obtained rows 306 and the modified rows 324 are sent by the data provider object 25 to the Worker 27, as shown in FIG. 3. Worker 27 then compares each of the obtained rows 306 with the corresponding data in the database 104. If no discrepancies are found, then it is deemed that no changes have been made to the corresponding data in the database 104 since the obtainment of that row, and thereafter that row in table 300 is replaced with its corresponding modified row, or deleted if such has been requested. If discrepancies are found, then it is deemed that changes have been made to the data in the database since the obtainment of the row, and the client application 100 is then notified of this circumstance, such as by way of a transmitted error message.

While this approach provides an effective method for preserving the integrity and accuracy of data in the database, it results in inefficient use of the system and networking resources. In particular, excessive network traffic is caused by transmission of the obtained rows 306 along with the modified rows 324 to the database, as well as extra consumption of the processor resources for verifying concurrency control constraints in comparing of each of obtained rows 306 with the corresponding data in the database 104. This inefficiency becomes particularly stark in high volume multi-programmed transaction processing environments where it is highly imperative that a client application 100 which perform update intensive tasks on the databases to be able to do so in as efficient a manner as possible to reduce operational processing time.

Figure 4A:
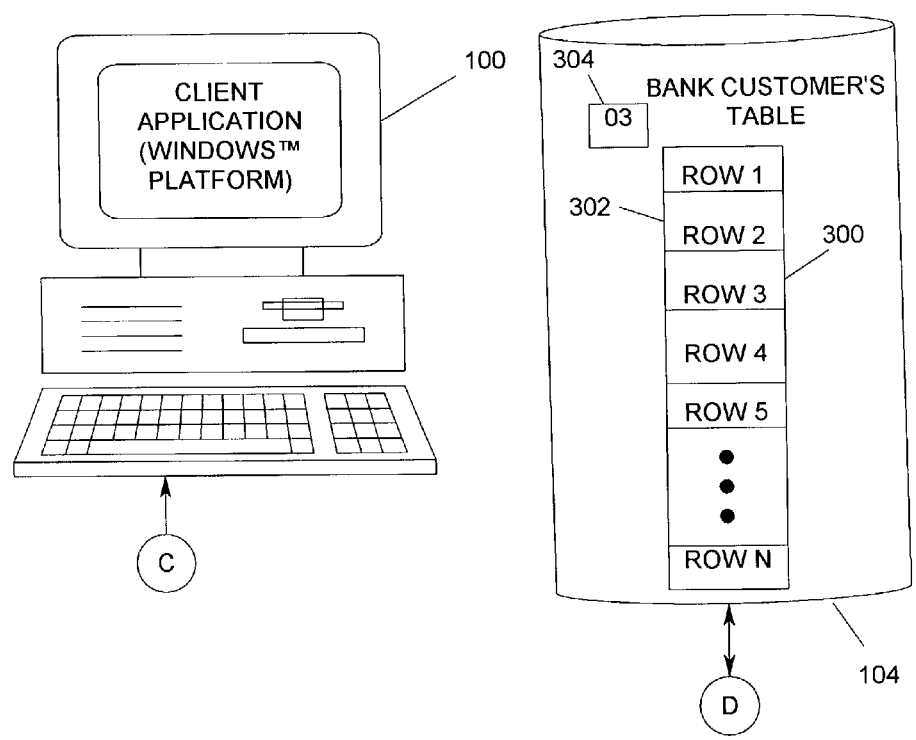
FIG. 4, developed as FIGS. 4A and 4B, is another expanded block diagram illustrating an exemplary system that may employ the methods and system of the present invention.
Figure 4B:
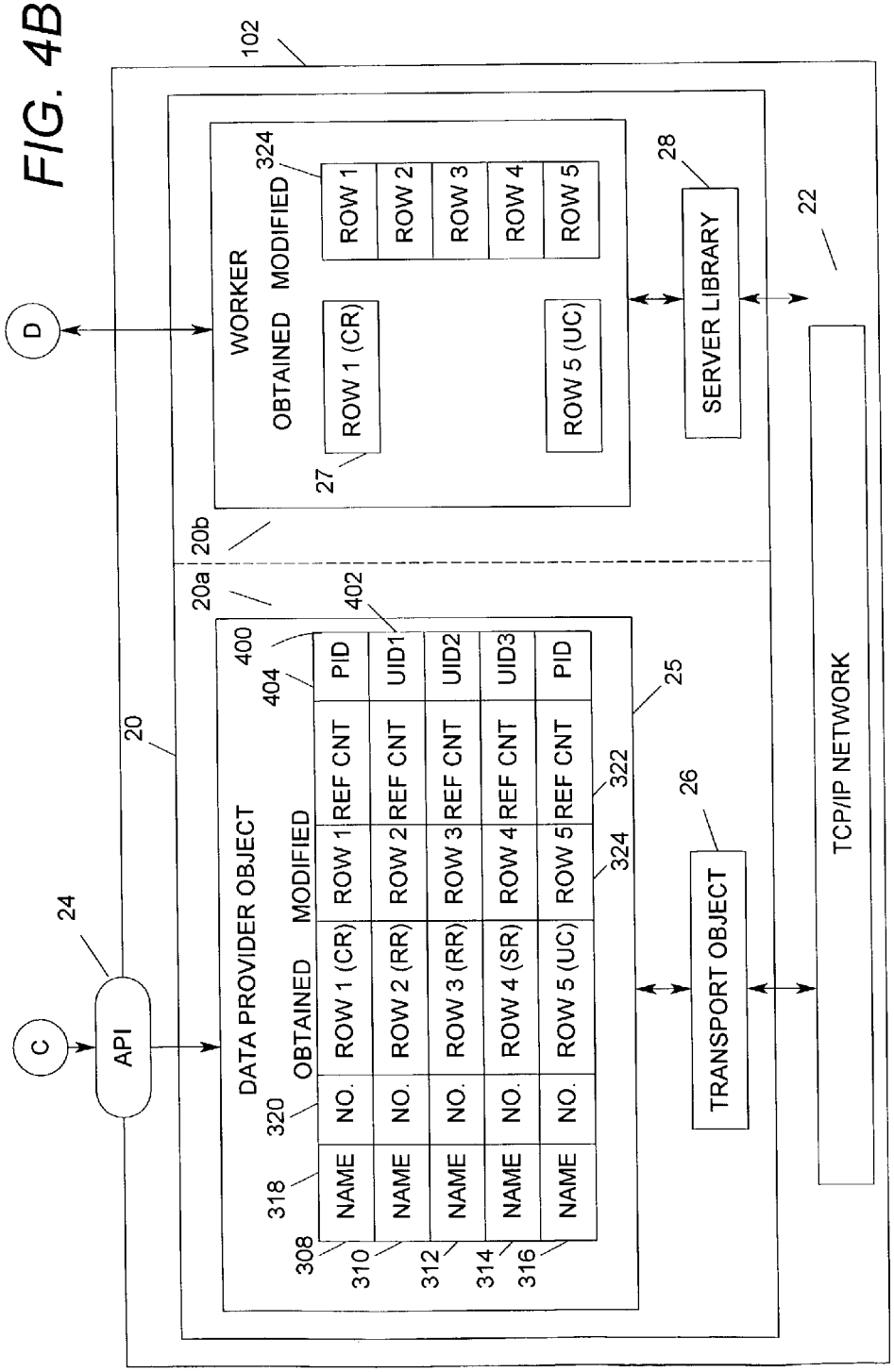

FIG. 4 is an expanded block diagram illustrating an exemplary system that may employ the methods and system of the present invention which reduces the need for transmission of the obtained rows along with the modified rows and therefore the comparison of the obtained rows with the corresponding data in the database, thus to increase the overall efficiency of a data access system.

In one embodiment, to obtain one or more rows from bank customer table 300, the client application 100 instructs the data provider object 25 to initiate an updating transaction using a predetermined obtaining protocol specified by the client application 100. The predetermined obtaining protocol specified by the client application 100 may vary from one row 302 to another. Upon receiving the instructions, the data provider object 25 then generates a unique transaction identifier for the initiated transaction. The data provider object 25 then communicates the transaction to the worker 27 in the manner described in FIG. 3. The Worker 27 then communicates with database 104 to obtain the requested rows from table 300 based on the predetermined obtaining protocol specified by the client application 100. Once the desired rows, such as rows 1–5 are obtained, the Worker 27 forwards the obtained rows 306 to data provider object 25 in the manner described in FIG. 2. The obtained rows 306 are then stored in the data provider object 25 such as in a set of row handles 308–316 in the manner described in FIG. 3.

In the present invention, a transaction identifier is then assigned to each row based on the predetermined obtaining protocol requested to be used for obtaining of that row from table 300 in database 104. If the predetermined obtaining protocol is a higher level isolation level, then the generated unique transaction identifier of the transaction used to obtain the row is assigned to that row, such as UID 402, having a unique value. If the predetermined obtaining protocol is a lower level isolation level, then a predetermined transaction identifier, such as PID 400, having a predetermined value, such as zero is assigned to that row. In an exemplary embodiment, the assignment is performed in the form appending of a new column-attribute 404 to each row handle 308–316 in each of which the transaction identifier generated for that row is stored.

In an embodiment of the present invention in which only one updating transaction is initiated and completed at a time, and wherein rows are only modified or deleted in the transaction in which they were fetched, once the modifications by client application 100 are performed, then the modifications are sent to database 104 for updating of table 300 in the following manner: For each row, first the transaction identifier assigned to that row is obtained, such as by retrieving the contents of column-attribute 404 in the row handle for that row. If the obtained transaction identifier is a unique transaction identifier denoting the use of a higher isolation level in obtaining of the row, then it is deemed that no changes have been made to the corresponding data in the database 104 since the obtainment of that row. This is because a higher isolation level inherently prevents any changes to be made to the data in the database 104 that correspond to the obtained data during the initiated transaction, and thus in this regard no need exists for comparing of the data in the database 104 that correspond to the obtained data Therefore transmission of an obtained row along with the modified row is not necessary. As shown in FIG. 4, rows 2–4 have all been obtained using the higher isolation levels of Repeatable Read (RR) or Serializable (RR) so only the modified row for these rows need be sent to worker 27, which will then, without comparisons, update the rows in table 300 by replacing them with their corresponding modified rows, or deleting them if such action has been requested.

If the obtained transaction identifier is a predetermined transaction identifier denoting the use of a lower isolation level in obtaining of the row, then it is deemed that changes may have been made to the corresponding data in the database 104 since the obtainment of that row and therefore both the obtained rows 306 and the modified rows 324 are sent to by the data provider object 25 to the Worker 27, as described in FIG. 3.

In an exemplary embodiment where the data-access system 102 utilizes unique row identifiers such as bookmarks, then a unique row identifier may be generated for each row, and wherein said row is to be deleted, the data provider object 25 forwards only said unique row identifier to the Worker 27 in lieu of the obtained or modified row, for deletion of that row in table 300 in database 104.

In an exemplary embodiment where only one updating transaction is initiated and completed at a time, then a predetermined flag may be set in lieu of using a unique transaction identifier to denote the predetermined obtaining protocol used prevents updatings of said obtained portion by other applications. The flag would then be reset after completion of each transaction for each row still held by the data provider 25. Another predetermined flag may be set in lieu of using a predetermined transaction identifier to denote the predetermined obtaining protocol used allows updatings of said obtained portion by other applications. The flag would then be reset after completion of each transaction for each row still held by the data provider 25.

One advantage of the foregoing feature of the present invention over the prior art is that by identifying those rows which were obtained by a higher level of isolation and forwarding only their modified versions or unique row identifiers (in case of a delete) to the database, the need for transmission of the obtained row and the comparison of the obtained row with the corresponding data in the database is reduced, thus to increase the overall efficiency of a data access system.

Figure 6:
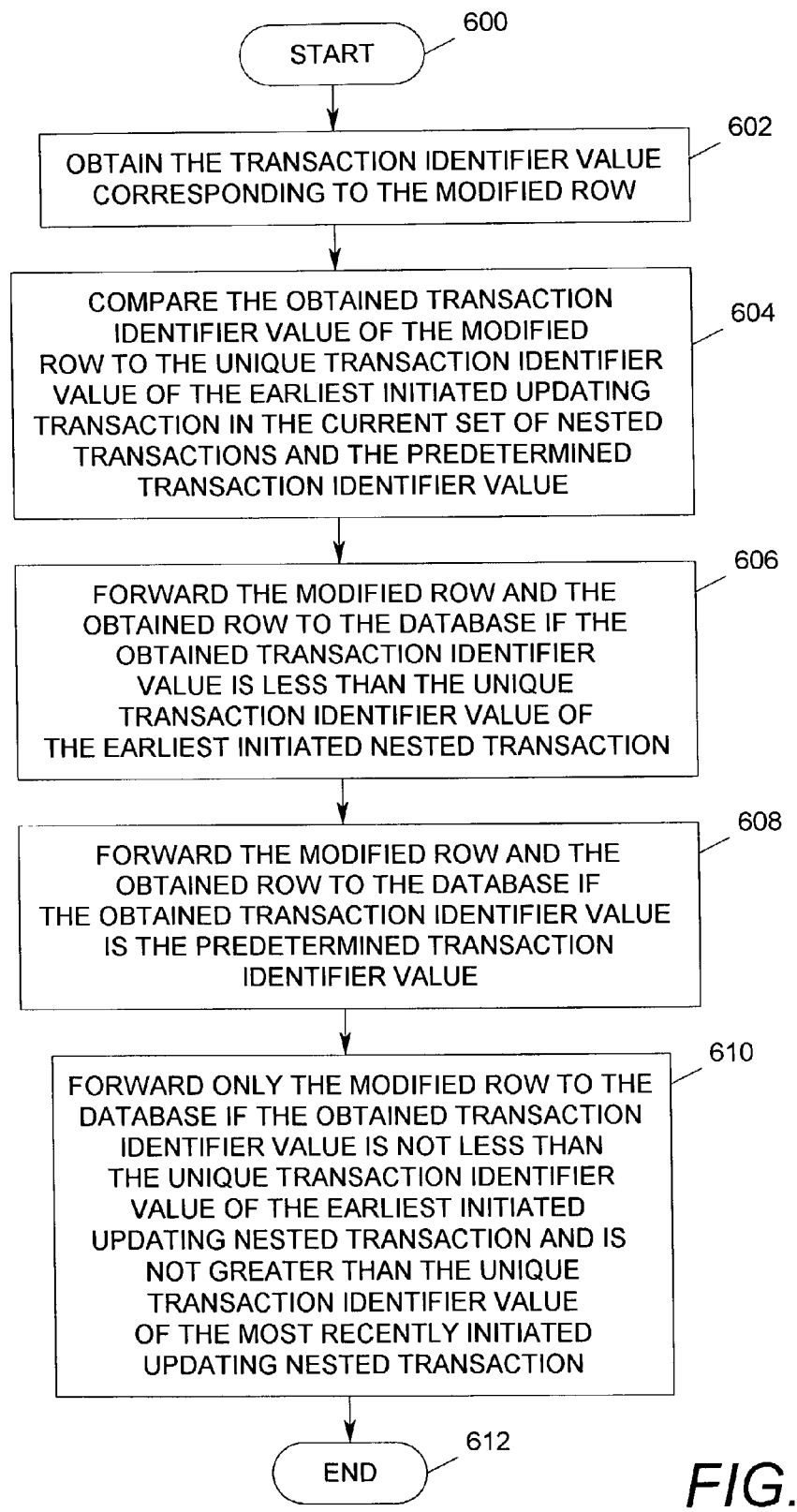
FIG. 6 is a flow chart of the process for forwarding of modified data to a database system according to a method of the present invention as illustrated in FIG. 4.
Figure 7:
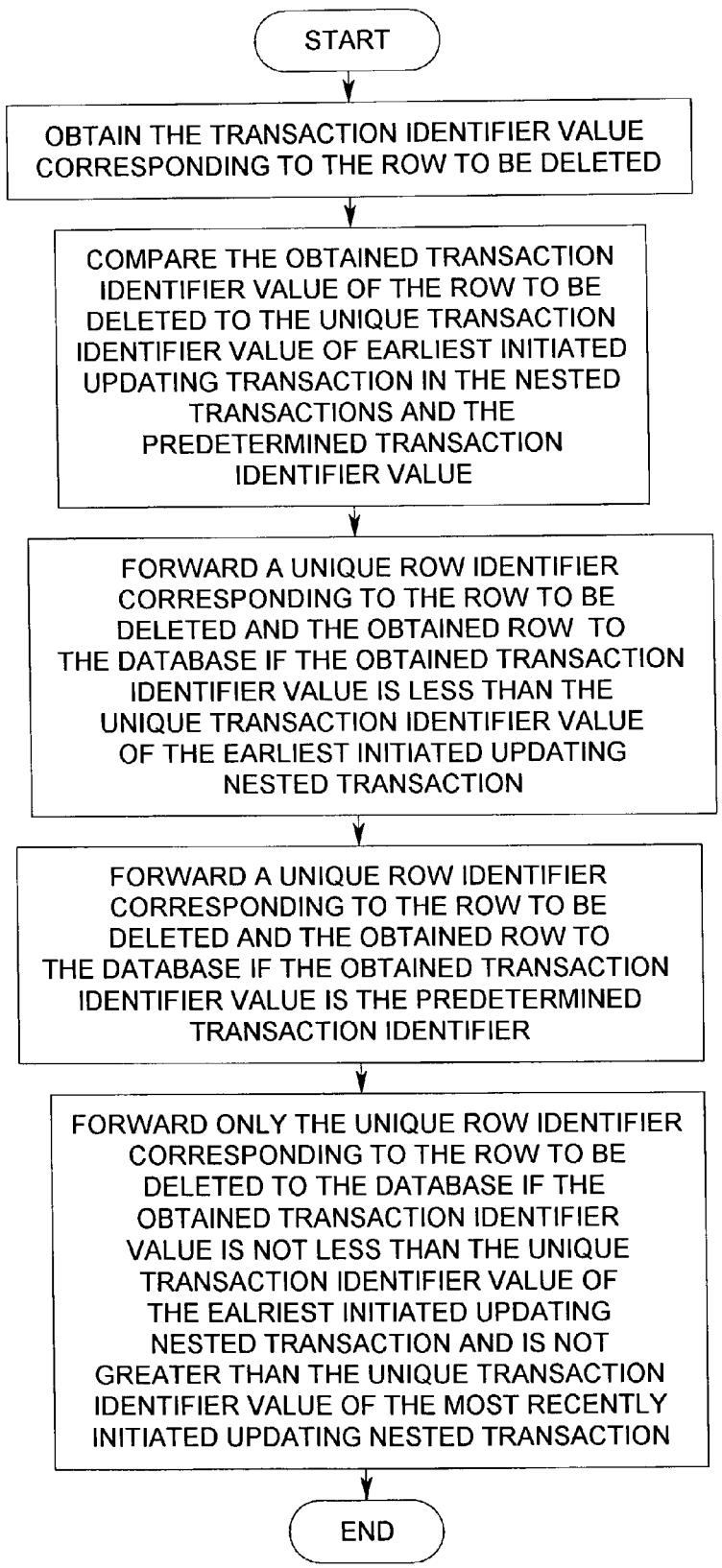
FIG. 7 is another flow chart of the process for forwarding of modified data to a database system according to a method of the present invention as illustrated in FIG. 4.

FIG. 5, FIG. 6 and FIG. 7 are flow charts illustrating another embodiment of the present invention as illustrated in FIG. 4 in the exemplary context of nested updating transactions in which more than one updating transaction is initiated and completed at a time, and wherein rows may have been fetched (and perhaps updated) outside as well as within the current transaction hierarchy. Nested transactions occur when a new transaction is initiated in a session that is already inside the scope of an already initiated transaction.

The new transaction is then said to be nested (or below the level of) the already initiated transaction. Generally, modifications to the obtained data made within the nested transaction are invisible to the earlier initiated transaction until the nested transactions are committed.

To better illustrate the workings of the present invention, FIG. 5, FIG. 6 and FIG. 7 are discussed in context of the following example in which an initiated independent Transaction T0 is followed by a set of nested initiated transactions T1, T2 and T3. It should be noted that present invention is no way limited to the following example and the line numberings in example are used only for ease of reference throughout the disclosure:

| | |
|---|---|
| -- line 1-- | Initiate T0 (RR) |
| -- line 2-- |     Fetch Row1 (UID0) |
| -- line 3-- | End T0 |
| -- line 4-- | Initiate T1 (RR) [X= UID1, C=UID1] |
| -- line 5-- |     Fetch/Modify Row2 (UID1) |
| -- line 6-- |     Fetch/Delete Row3 (UID1) |
| -- line 7-- |     Initiate T2 (RR) [X= UID1, C=UID2] |
| -- line 8-- |         Fetch/Modify Row4 (UID2) |
| -- line 9-- |         Initiate T3 (UC) [X= UID1, C=UID3] |
| -- line 10-- |             Fetch/Modify Row5 (PID) |
| -- line 11-- |             Modify Row 1 |
| -- line 12-- |         End T3 |
| -- line 13-- |         Update[Row 2(modified), Row 3(Unique Row_ID), Row 4 (modified), Row 5(obtained, modified), Row 1(obtained, modified)] |
| -- line 14-- |     End T2 |
| -- line 15-- | End T1 |

Returning to FIG. 5, the flow begins at block 500 and proceeds to block 502 where a nested transaction T1 in line 4 of the example is initiated based on the predetermined obtaining protocol of Repeatable Read (RR). Next, in block 504, a unique transaction identifier (UID) is generated for the nested transaction T1 having a value UID1 that is greater than the value generated for the latest initiated transaction. As shown, independent transaction T0 was initiated before the nested transaction T1 and with a UID value of UID0. In this embodiment of the present invention, a unique transaction identifier is generated for each initiated transaction wherein the UID for each successive transaction is greater by a predetermined amount than the UID generated for the latest initiated transaction. Returning to the example, since T1 is the earliest initiated nested transaction, the constant X in line 4 associated with the earliest nested transaction is set to the value of the UID generated for T1, (i.e. to UID1). At this point, since T1 is also the most recently initiated transaction, the variable C associated with the most recently initiated transaction is also set to the value UID1. Next, in block 506, the rows to be obtained from the database such as row 2 and row 3 are obtained pursuant to the fetch instructions of lines 5 and 6, respectively. Next, in the decision block 508, it is determined whether the obtaining protocol prevents updating of the data in the database corresponding to the obtained data by other applications prior to the completion of the initiated transaction T1. Since T1 was initiated by Repeatable Read, the flow then proceed to block 510 where the value UID1 for T1 is assigned to each of row 2 and row 3, such as by appending of the UID1 value to the row handle for row 2 and row 3 in a manner as described in FIG. 4. The flow then proceeds to and ending in block 514.

The process of FIG. 5 repeats for every initiated transaction within a set of nested transactions such as T1, T2 and T3. Thus when line 7 of the example is reached, a second nested transaction T2 is initiated in block 502 based on the predetermined obtaining protocol of Repeatable Read (RR). Next, in block 504, a unique transaction identifier (UID) is generated for the nested transaction T2 but of value greater than the value generated for T1, such as UID2, which is greater than UID1 by a predetermined amount, such as 1. At this point, T2 is now the most recently initiated transaction, and thus the variable C associated with the most recently initiated transaction is set to the value UID2. Next in block 506 the row to be obtained from the database such as row 4 is obtained pursuant to the fetch instructions of line 8. Next, in the decision block 508, it is determined that the obtaining protocol for T2 is a Repeatable Read, so the flow then proceed to block 510 where the value UID2 for T2 is assigned to row 4, such as by appending of the UID2 value to the row handle for row 4 in a manner as described in FIG. 4 The flow then proceeds to and ending in block 514.

As describe above, the process of FIG. 5 repeats for every initiated transaction within a set of nested transactions such as T1, T2 and T3. Thus when line 9 of the example is reached, a third nested transaction T3 is initiated in block 502 based on the predetermined obtaining protocol of Uncommitted Read (UC). Next, in block 504, a unique transaction identifier (UID) is generated for the nested transaction T3 but of value greater than the value generated for T2, such as UID3, which is greater than UID2 by a predetermined amount, such as 1. At this point, T3 is now the most recently initiated transaction, and thus the variable C associated with the most recently initiated transaction is set to the value UID3. Next in block 506 the row to be obtained from the database such as row 5 is obtained pursuant to the fetch instructions of line 10. Next, in the decision block 508 it is determined that the obtaining protocol for T3 is a Uncommitted Read which allows for updating of the data in the database corresponding to the obtained data by other applications prior to the completion of the initiated transaction T3. Thus, the flow then proceed to block 512 where a predetermined transaction identifier (PID) is assigned to row 5, such as by appending of the PID value to the row handle for row 4 in a manner as described in FIG. 4. The PID for row 5 has a value that is smaller than all of the UID values generated for any of the transactions (i.e. T0, T1, T2 and T3) and thus it is smaller than UID1 for T1. For the modification operation performed on row 1 that was obtained by T0 (a transaction outside of the current set of nested transactions T1, T2 and T3) the UID0 value originally assigned to row 1 in line 2 is retained by row 1 in line 11 since T3 is only modifying row 1 and not re-fetching it (a re-fetching would have given row 1 a new value of PID since it would have been then last re-fetched under T3's Uncommitted Read). The flow then proceeds to and ends in block 514.

Once the modifications and deletions to the obtained rows are performed on the obtained rows 1–5, such as a modification to row 2 in line 5, deletion of row 3 in line 6, modification to row 4 in line 8, modification to row 5 in line 10 and modification to row 1 in line 11, then the process described below in conjunction with FIG. 6 and FIG. 7 are used to determine for which obtained rows, only the corresponding modified rows need be sent back to the Worker 27 for updating of the database 104. In an exemplary embodiment, the rows 1–5 are sent back to the Worker 27 as parameters of a function call, such as Update shown in line 13 of the example.

FIG. 6 is a flow chart of the process for forwarding of modified rows to a database system according to a method of the present invention as illustrated in FIG. 4. As with FIG. 5, the process in FIG. 6 is performed for each modified rows 1, 2, 4, 5 of the example. The process begins at block 600 and proceeds to block 602 where the transaction identifier value corresponding to each modified row is obtained. In the example, the obtained the transaction identifier value for row 1 is PID, for row 2 is UID1, for row 4 is UID2 and for row 5 is PID.

Next, in block 604, the obtained transaction identifier value of each modified row is compared to the unique transaction identifier value of the earliest initiated updating transaction in the nested transaction hierarchy (i.e. UID1 for T1 in the example) as well as to the predetermined transaction identifier value PID.

The manner in which each row is forwarded to the database 104 is determined based on the following: in block 606 both the modified row and the obtained row are forwarded to the database 104 if the obtained transaction identifier value for a row is less than the unique transaction identifier value of the earliest initiated updating nested transaction (i.e. UID1 for T1 in the example). In the above example the obtained transaction identifier value for row 1 is UID0 and for row 5 is a PID which as described earlier is less than UID1. Therefore both the modified row and the obtained row are forwarded to the database 104 for row 1 and row 5, for example as parameters of the Update function in line 13 of the example. It should be noted that although row 1 was initially obtained by a repeatable read which prevents updating of the data in the database 104 corresponding to the obtained data by other applications prior to the completion of the initiated transaction T0, the completion of T0 at line 3 in the example would release the row 1 from the protection of repeatable read transaction isolation so that by line 13, changes may have been by other concurrent applications in database 104 corresponding to the obtained data of row 1. Thus, the obtained row for row 1 must still be forwarded along with the modified row for row 1.

Next in block 608, the modified row and the obtained row are also both forwarded to the database 104 if the obtained transaction identifier value is the predetermined transaction identifier value. In the above example, the obtained transaction identifier value for row 5 is PID which as described earlier is less than UID1. Therefore both the modified row and the obtained row are forwarded to the database 104, for example as parameters of the Update function in line 13 of the example. It should be noted that the forwarding occurs only once per row even if a row satisfies the criteria of more than one block in FIG. 6, so that in this particular example, the modified row and the obtained row for row 5 are sent only once by the Update function.

Next, in block 610, only the modified row is forwarded to the database 104 if the obtained transaction identifier value of a row is not less than the unique transaction identifier value of the earliest initiated updating nested transaction (i.e. UID1 for T1 in the example) and is not greater than the unique transaction identifier value of the most recently initiated updating nested transaction (i.e. UID3 for T3 in the example). In the above example the obtained transaction identifier value for row 2 is UID1 which is not less than UID1 (i.e. not less than itself) and UID1 is also not greater than UID3. Likewise for row 4, the obtained transaction identifier value for row 4 is UID2 which is not less than UID1, and also not greater than UID3. Thus for row 2 and row 4, only the modified rows are sent to the database 104, for example as parameters of the Update function in line 13 of the example. The process in FIG. 6 then flows to block 612 where it then ends.

FIG. 7 is another flow chart of the process for forwarding of rows to be deleted to a database system according to a method of the present invention as illustrated in FIG. 4. As with FIG. 6, the process in FIG. 7 is performed for each row to be deleted. The process begins at block 700 and proceeds to block 702 where the transaction identifier value corresponding to the row to be deleted is obtained. In the example, the obtained the transaction identifier value for row 3 is UID1.

Next, in block 704, the obtained transaction identifier value of the row to be deleted is compared to the unique transaction identifier value of the earliest initiated updating transaction in the nested transactions (i.e. UID1 for T1 in the example) as well as to the predetermined transaction identifier value PID.

The manner in which a row to be deleted is forwarded to the database 104 is determined based on the following determination: in block 706 both a unique row identifier corresponding to the row be deleted, such as a bookmark to the row to be deleted, and the obtained row are forwarded to the database 104 if the obtained transaction identifier value for the row to be deleted is less than the unique transaction identifier value of the earliest initiated updating nested transaction (i.e. UID1 for T1 in the example). In the above example the obtained transaction identifier value for row 3 is UID1 which as described earlier not less than UID1 (i.e. not less than itself). Next in block 708, both a unique row identifier corresponding to the row be deleted, such as a bookmark to the row to be deleted, and the obtained row are forwarded to the database 104 if the obtained transaction identifier value is the predetermined transaction identifier value. In the above example, the obtained transaction identifier value for row 3 is UID1 which as described earlier is greater than PID.

Next, in block 710, only the a unique row identifier corresponding to the row be deleted, such as a bookmark to the row to be deleted is forwarded to the database 104 if the obtained transaction identifier value of the row to be deleted is not less than the unique transaction identifier value of the earliest initiated updating nested transaction (i.e. UID1 for T1 in the example) and is not greater than the unique transaction identifier value of the most recently initiated updating nested transaction (i.e. UID3 for T3 in the example). In the above example the obtained transaction identifier value for row 3 is UID1 which is not less than UID1 (i.e. not less than itself) and UID1 is also not greater than UID3. Thus for row 3, only the unique row identifier corresponding to the row 3 is sent to the database 104, for example as a parameter of the Update function in line 13 of the example. The process in FIG. 7 then flows to block 712 where it then ends.

One advantage of the foregoing feature of the present invention over the prior art is that by identifying those rows which were obtained by a higher level of isolation and forwarding only their modified versions or unique row identifiers (in case of a delete) to the database, the need for transmission of the obtained row and the comparison of the obtained row with the corresponding data in the database is reduced, thus to increase the overall efficiency of a data access system.

Figure 8:
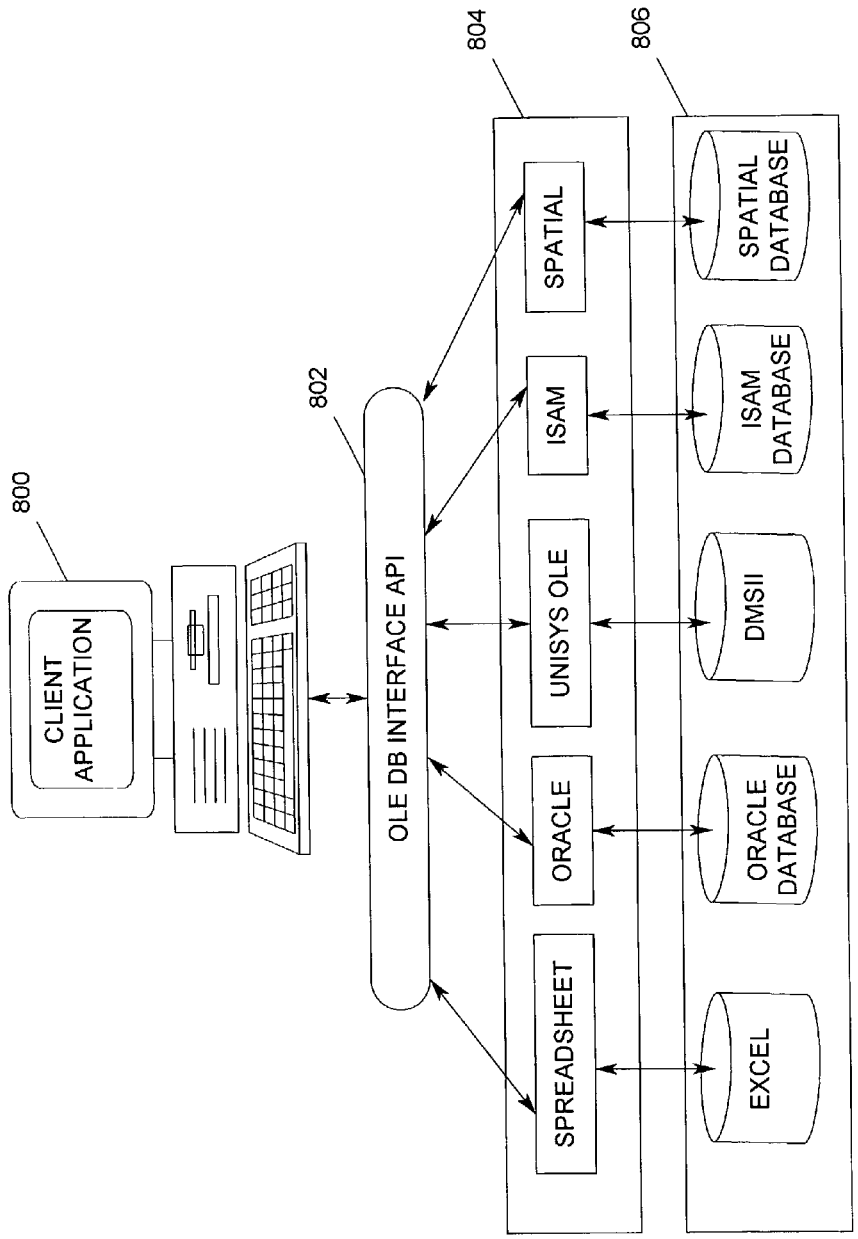
FIG. 8 is an extended block diagram of other exemplary systems that may employ the methods and system of the present invention.

It should be noted that other client-server data-access systems, such as OLE DB-modeled spreadsheet, Oracle, ISAM and Spatial could be used in place of a Unisys OLE DB Data Provider. FIG. 8 is an extended block diagram of exemplary systems that may employ the methods and system of the present invention. A client application 800 can use OLE DB interfaces 802 to interface with various OLE DB-modeled Providers 804, wherein each OLE DB-modeled Provider interfaces with a different one of the databases 806, such as Excel, Oracle database, ISAM database and Spatial database, as shown. Another example of a client-server data-access system that may employ the methods and systems of the present invention is described in patent application entitled "METHODS AND SYSTEM FOR ACCESSING LOGICAL RELATIONSHIP DATA IN A DATABASE FROM A DATA-ACCESS SYSTEM UTILIZING BOOKMARKS", filed on Jun. 4, 2002, as U.S. Ser. No. 10/163,103, now U.S. Pat. No. 7,058,631 the details of which are herein incorporated by reference. It should be noted, however, that the present invention is not limited to OLE DB-modeled data-access systems and that the present invention can be used with any data access system that is a client-server data access system.

It should be noted that the various features of the foregoing embodiments were discussed separately for clarity of description only and they can be incorporated in whole or in part into a single embodiment of the invention having all or some of these features.

Although the invention has been described with reference to specific embodiments, this description is not meant to be construed in a limiting sense. Various modifications of the disclosed embodiments as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method for facilitating updating of data in a database by a data-access system in communication with said database and a client application, said method comprising:

initiating a plurality of updating transactions by said data-access system based on a plurality of requests received from said client application for obtaining a portion of said database based on at least one predetermined obtaining protocol;

generating a plurality of unique transaction identifiers in said data-access system wherein each said unique transaction identifier having a identifier value and generated upon said initiating of an updating transaction in said plurality of updating transactions and correspond to said initiated updating transactions;

assigning at least one of a said unique transaction identifier and a predetermined transaction identifier to said portion obtained by said updating transaction;

modifying at least one of said obtained portions of said database based on instructions received from said client application; and forwarding said modified portions to said database based on the transaction identifier assigned to each modified portion;

wherein said data access system is a client-server data access system having a client-end interfacing with said client application, and a server-end interfacing with said database;

wherein said plurality of updating transactions are nested updating transactions initiated in successive order;

wherein said assigning of a said transaction identifier to said portion obtained by said updating transaction further comprises assigning the unique transaction identifier of each updating transaction to said portion obtained by said updating transaction if said predetermined obtaining protocol for said updating transaction prevents updatings of data in said database corresponding to said obtained portion by other applications prior to completion of said initiated updating transaction by said client application;

wherein said assigned unique transaction identifier having a unique transaction identifier value;

wherein said assigned unique transaction identifier value for each said initiated updating transactions increases a predetermined amount with each said successive initiation order;

wherein said assigning of a predetermined transaction identifier to said portion obtained by said updating transaction further comprises assigning a predetermined transaction identifier having a predetermined identifier value to each said portion obtained by said updating transaction if said predetermined obtaining protocol for said updating transaction allows updatings of data in said database corresponding to said obtained portion by other applications prior to completion of said initiated updating transaction by said client application; and wherein said predetermined transaction identifier value is less than each of said unique transaction identifier values.

2. A method in accordance with claim 1, wherein said client-server data access system is based on an Object Linking and Embedding Database (OLE DB) data access model.

3. A method in accordance with claim 1, wherein said transaction identifiers are generated in said client-end.

4. A method in accordance with claim 1, wherein each said portion obtained by an updating transaction includes at least one row having at least one column-attribute in a predetermined data table in said database and wherein said assigning further comprising:

assigning to each said row one of said transaction identifier values corresponding to said updating transaction for obtaining said row.

5. A method in accordance with claim 4, wherein said assigning to each said row includes appending in said client-end said transaction identifier value corresponding to said assigned transaction identifier to each said obtained row.

6. A method in accordance with claim 5, wherein said appending includes appending a column-attribute containing said corresponding identifier value to each said obtained row.

7. A method in accordance with claim 6, said modifying further including modifying at least one column-attribute in said at least one row; and generating a modified row for storing said modified obtained row.

8. A method in accordance with claim 7, wherein said modifying includes inclusion of at least one instruction to delete at least one said row in said obtained portion containing said row.

9. A method in accordance with claim 8, said forwarding comprising:

obtaining said appended transaction identifier value corresponding to said modified row;

comparing said obtained transaction identifier value of said modified row to the unique transaction identifier value of the earliest initiated updating transaction in said nested transactions and said predetermined transaction identifier value;

forwarding said modified row and said obtained row to said database if said obtained transaction identifier value is less than said unique transaction identifier value of said earliest initiated updating nested transaction;

forwarding said modified row and said obtained row to said database if said obtained transaction identifier value is said predetermined transaction identifier value; and forwarding only said modified row to said database if said obtained transaction identifier value is not less than said unique transaction identifier value of said earliest initiated updating nested transaction and is not greater than the unique transaction identifier value of the most recently initiated updating nested transaction.

10. A method in accordance with claim 9, said forwarding comprising:

obtaining said appended transaction identifier value corresponding to said row to be deleted;

comparing said obtained transaction identifier value of said row to be deleted to the unique transaction identifier value of the earliest initiated updating transaction in said nested transactions and said predetermined transaction identifier value;

forwarding said instructions to delete said row to be deleted and said obtained row to said database if said obtained transaction identifier value is less than said unique transaction identifier value of said earliest initiated updating nested transaction;

forwarding said instructions to delete said row to be deleted and said obtained row to said database if said obtained transaction identifier value is said predetermined transaction identifier value; and forwarding only said row to be deleted to said database if said obtained transaction identifier value is not less than said unique transaction identifier value of said earliest initiated updating nested transaction and not greater than the unique transaction identifier value of the most recently initiated updating nested transaction.

11. A method in accordance with claim 8, wherein said data access system is a data-access system utilizing unique row identifiers.

12. A method in accordance with claim 11, wherein said forwarding comprising:

obtaining said appended transaction identifier value corresponding to said row to be deleted;

comparing said obtained transaction identifier value of said row to be deleted to the unique transaction identifier value of earliest initiated updating transaction in said nested transactions and said predetermined transaction identifier value;

forwarding a unique row identifier corresponding to said row to be deleted and said obtained row to said database if said obtained transaction identifier value is less than said unique transaction identifier value of said earliest initiated updating nested transaction;

forwarding said unique row identifier corresponding to said row to be deleted and said obtained row to said database if said obtained transaction identifier value is said predetermined transaction identifier value; and forwarding only said unique row identifier corresponding to said row to be deleted to said database if said obtained transaction identifier value is not less than said unique transaction identifier value of said earliest initiated updating nested transaction and is not greater than the unique transaction identifier value of the most recently initiated updating nested transaction.

13. A method in accordance with claim 11, wherein said unique row identifier is a unique bookmark for said row.

14. A method in accordance with claim 1, wherein said assigned transaction identifier is a numerical transaction identifier.

15. A method in accordance with claim 1, wherein said predetermined transaction identifier is a predetermined flag denoting said predetermined obtaining protocol allowing updatings of said obtained portion by other applications.

16. A method in accordance with claim 1, wherein said predetermined obtaining protocol preventing updatings of said obtained portion by other applications is at least one of a OLE DB repeatable-read and serializable protocols.

17. A method in accordance with claim 1, wherein said predetermined obtaining protocol allowing updatings of said obtained portion by other applications is at least one of a OLE DB read-uncommitted and read-committed protocols.

18. A method in accordance with claim 1, wherein said database is a network data modeled database.

19. A method in accordance with claim 18, wherein said database is an Enterprise Database Server for Clearpath Master Control Program (MCP).

20. A method in accordance with claim 1, wherein said client application is a Windows™ application.

* * * * *